United States Patent Office 2,833,692
Patented May 6, 1958

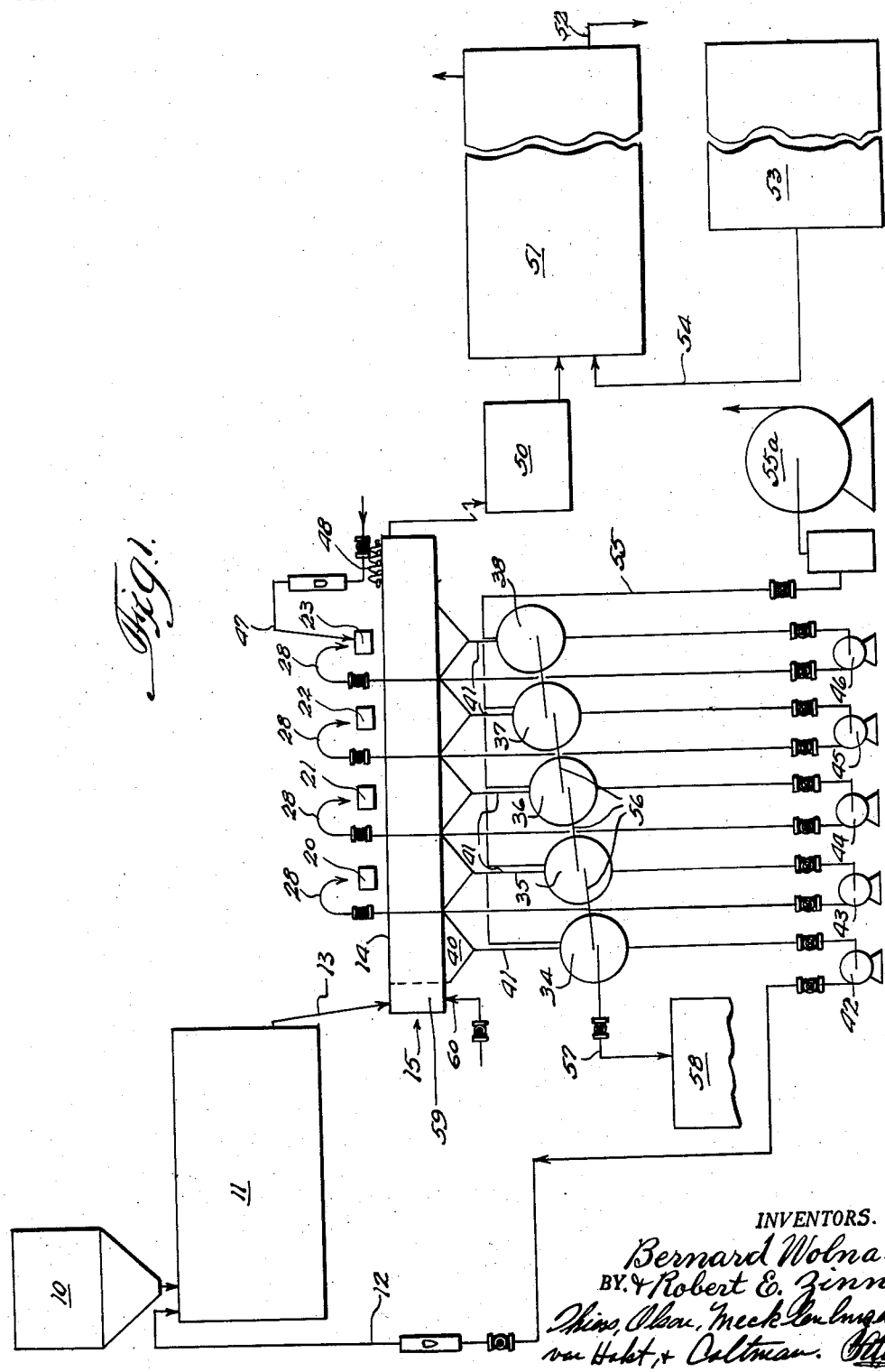

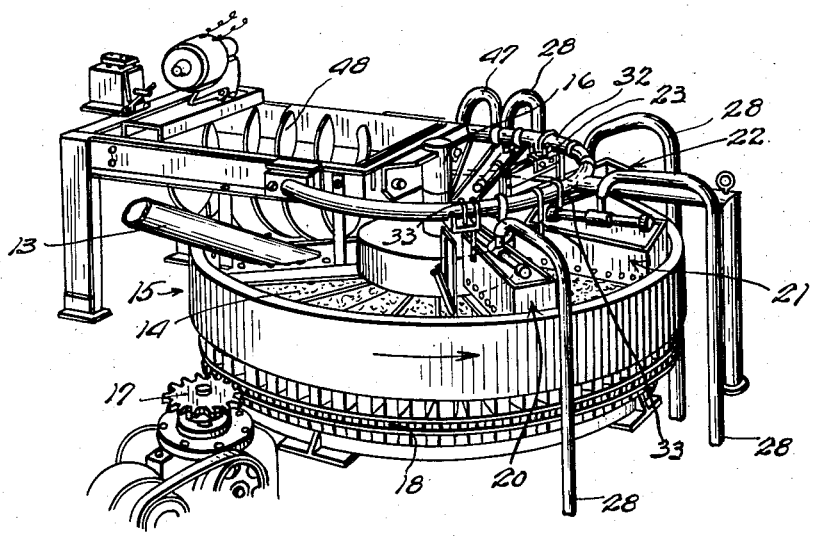
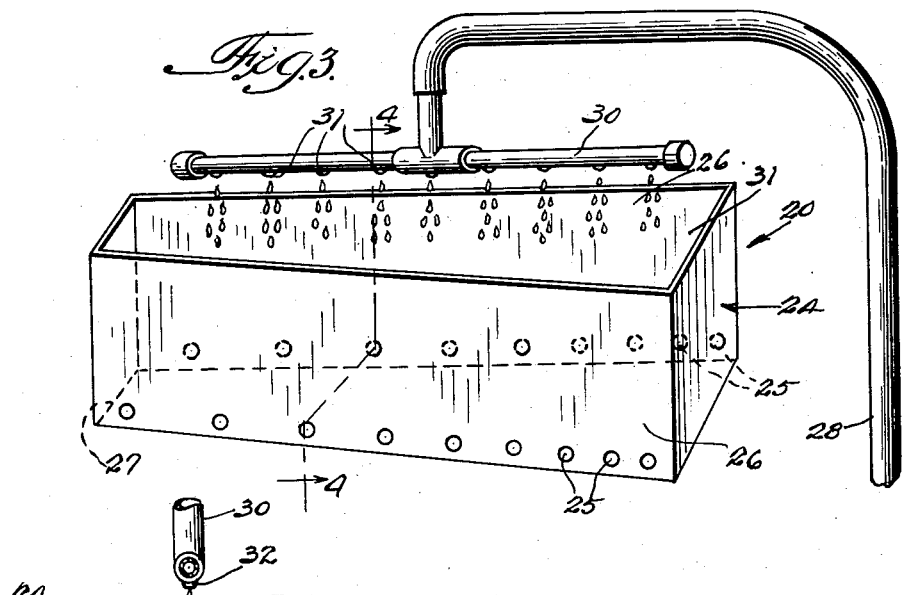
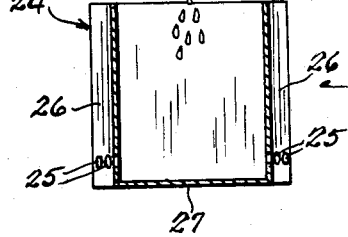
INVENTORS.
Bernard Wolnak
BY & Robert E. Zinn

2,833,692

PROCESS FOR PRODUCING A VITAMIN $B_{12}$ ACTIVE PRODUCT FROM SEWAGE SLUDGE

Bernard Wolnak, Chicago, and Robert E. Zinn, Wilmette, Ill., assignors to Sewerage Commission of the City of Milwaukee, Milwaukee, Wis., a corporation of Wisconsin Application November 15, 1954, Serial No. 468,705

1 Claim. (Cl. 167—81)

This invention relates to an improved process for producing a vitamin $B_{12}$ active product from sewage sludge and an apparatus for use in performing such a process. The product produced by the process to be hereinafter described and the source material utilized in the process are generally the same as that disclosed in Miner and Wolnak United States Patent No. 2,646,386, dated July 21, 1953.

The nutritional benefits to be derived from the incorporation of a vitamin $B_{12}$ active product in prepared feeds for poultry and other nonruminant animals is well recognized. As disclosed in said Patent No. 2,646,386, a product having a relatively high vitamin $B_{12}$ content may be readily and inexpensively obtained by leaching or extracting a sewage sludge, such as dried activated sludge, with a suitable solvent, such as water. However, in commercial operations it is desirable to carry out the extraction procedure in such a manner that the extracted sludge will retain a substantial proportion of its original nitrogen content so that it may still be used as a fertilizer. Also, the process should be one which may be easily carried out, preferably continuously, in such a manner that the particle size of the extracted material, when redried, remains substantially unchanged so as to be commercially acceptable to the fertilizer trade. Various attempts have been made to fulfill such production requirements but difficulties have been encountered due in part to the various inherent characteristics of the source material which were adverse to certain types of handling. Also, numerous types of apparatus have been suggested but have not been commercially practiced because of difficulty in maintaining them in proper working order or because of the high initial and operating costs involved.

Thus, it is one of the objects of this invention to provide a process for readily producing a vitamin $B_{12}$ active product from a readily available inexpensive source material.

It is a further object of this invention to provide a process which is capable of continuously producing high yields of a vitamin $B_{12}$ active product.

It is a still further object of this invention to provide an apparatus particularly adaptable for extracting such a product from dried sewage sludge, which apparatus reduces erection, production, and maintenance costs to a minimum, is effective in operation, and results in a high yield of the desired product.

It is a still further object of this invention to provide a process which produces the desired product from the source material without adversely affecting the utility and commercial value of the processed source material as a fertilizer.

Further and additional objects will appear from the following description, accompanying drawings, and appended claims.

In accordance with one embodiment of this invention, a process and apparatus are provided wherein relatively dry sewage sludge, such as activated sludge, is fed at a continuous rate into a reservoir wherein it is temporarily accumulated. While disposed within the reservoir, the sludge is wetted by a solvent which preferably is enriched with a vitamin $B_{12}$ active extract which has been obtained from previously processed sludge in a later stage of the process. From the reservoir, the wetted sludge is fed as a slurry at a predetermined rate onto a movable foraminous base. While the sludge is deposited upon the base, it is subjected, at various predetermined stations of travel on the base, to leaching or washing by solutions containing the same solvent but with varying concentrations of the desired product. The leaching solution at each successive station contains a progressively smaller concentration of the desired product as is characteristic of countercurrent extraction techniques. The leaching solution is collected from each station and a substantial portion thereof recirculated through the deposited sludge moving past that station but a portion of the solution from each station is passed to an earlier station so that the leaching solutions in the earlier stages of the sludge washings have higher concentrations of the vitamin $B_{12}$ active material. At the last station, prior to the deposited sludge being removed from the foraminous base, the cycled leaching solution is supplemented by make-up solvent which is usually free of the soluble product. A first portion of the leaching solution, collected at or adjacent to the first station and containing the highest concentration of extract, is utilized as the solution for wetting the relatively dry sludge which is added to the reservoir. A second portion of this leaching solution, collected at or adjacent to the first station, is withdrawn from the extraction system and subjected to an evaporation or other concentration step wherein the concentration of the vitamin $B_{12}$ is materially increased. The resulting solution, which may have a solids content in excess of 20 or 30 percent by weight, is relatively stable upon storage and may be dried, further concentrated or otherwise treated to concentrate or separate the vitamin $B_{12}$ therefrom. The extracted or leached sludge, subsequent to removal from the foraminous base, is subjected to a drying operation to produce a relatively dry sewage sludge possessed of the same important fertilizing ingredients that it contained prior to being subjected to the process.

For a more complete understanding of this invention, reference should be made to the drawings wherein:

Figure 1 is a diagrammatic view of the apparatus utilized in performing the improved process;

Fig. 2 is a fragmentary perspective view of the sludge leaching and filtering unit which forms an important part of the apparatus shown in Fig. 1;

Fig. 3 is an enlarged fragmentary perspective view of one of the dispensing units disposed above the foraminous base; and Fig. 4 is a sectional view taken along line 4—4 of Fig. 3.

Referring now to the drawings and more particularly to Fig. 1, a diagrammatic view of the improved apparatus is shown for use in carrying out a continuous process of extracting a vitamin $B_{12}$ active product from sewage sludge. The sludge utilized as source material in this instance is known in the industry as activated sludge and sold commercially in a dry state under the trade name "Milorganite." This material is in the form of solid heat-dried particles and is essentially free of very small particles that may be characterized as dust or fines. The commercial procedure utilized in obtaining such activated sludge is outlined in said Patent No. 2,646,386. The term "activated sludge" as used herein means any substance which comprises essentially a mass of microorganisms that are formed during the aeration of inoculated sewage under conditions favoring microbial growth.

The essentially dry activated sludge is first introduced at a predetermined rate from a hopper or bin 10 into one end of an elongated reservoir or tank 11, known as a prewetter. The sludge, while temporarily housed within the reservoir 11, is subjected to a wetting action by a solution; in this instance, containing water and a relatively high concentration of the desired vitamin $B_{12}$ active product. It should be mentioned at this point that vitamin $B_{12}$ is readily soluble in water as well as in other solvents such as isopropyl alcohol, ethyl alcohol, methyl alcohol, water-saturated butyl alcohol, water-diluted acetone and the like. Water, such as tap water, is the preferred solvent and may be introduced at any desired temperature. The wetting solution introduced at the upperside of the reservoir through a conduit 12 preferably is heated to between about 30 and 50° C. before or after introduction into the prewetter 11 for best results. The source from which this wetting solution is obtained will be discussed more fully hereinafter.

From the opposite end of the reservoir 11, the wetted sludge is fed as a slurry, preferably by gravity, through a conduit 13 onto a rotating, horizontally disposed, foraminous base or table 14 which forms a part of the sludge washing and filtering unit or assembly 15, shown diagrammatically in Fig. 1 but in detail in Fig. 2. The base 14 is rotated at a predetermined speed about a center upright shaft 16 as an axis by a motor driven pinion gear 17 which meshes with a ring gear 18 affixed to the periphery of the base 14.

Arranged in annularly spaced relation above base 14 are a plurality of trough-like elements or weir boxes 20, 21, 22, and 23 from which a solution of water (solvent) and the desired soluble product is dispensed to effect leaching of the sludge deposited on the base, as such sludge is passed beneath the various elements upon movement of the base 14. The elements 20, 21, 22, and 23 may be considered as disposed above various stations along the path traveled by the base 14. The elements are all of substantially the same construction and, as seen in Figs. 3 and 4, each element is in the form of a wedge-shaped container 24 having a row of perforations 25 formed in each of the elongated sides 26 thereof adjacent the bottom side 27 which is of imperforate construction. The spacing of these perforations is in direct proportion to the area of the filter sector, there being proportionately more perforations toward the outer perimeter of the foraminous base. The container 24 is shaped to conform substantially to a sector of the base 14. By having the rows of perforations disposed on the sides 26 of the container the solution is dispensed therefrom in the form of drops or streams which fall by gravity under substantially no pressure head thereby eliminating spray nozzles or jets which latter would disrupt the filter bed resulting in channeling and inefficient leaching of the sludge on the foraminous base 14. The leaching solution is introduced into each element 20, 21, 22, or 23 through conduits 28, each having a transversely extending elongated discharge header 30 affixed to the end of conduit 28 and being disposed above the element. The length of the header 30 is substantially equal to the radial dimension of the element. The header 30 is provided with a plurality of longitudinally spaced downwardly directed orifices 31 through which the leaching solution is discharged into the element. Each element 20, 21, 22, or 23 is suspended from an overhead frame 32 of unit 15 by suitable straps 33, which have the depending ends thereof secured by welding or any other suitable means to the elongated sides 26 of the container.

As noted in Fig. 1, disposed beneath base 14 are diagrammatically shown a plurality of receptacles 34, 35, 36, 37, and 38 which are adapted to collect the solution which percolates through the sludge deposited upon the base 14. Receptacles 35, 36, 37, and 38 are provided for dispensing elements 20, 21, 22, and 23, respectively. Receptacle 34 is provided to collect excess wetting solution that separates from the deposited sludge prior to the latter reaching a point below the first dispensing element 20. Each receptacle is provided with a catch basin 40 which, in the case of elements 20 through 23, is in substantial vertical alignment with the respective element disposed thereabove. The basin 40 for receptacle 34 spans a portion only of the area between the point where the sludge slurry is deposited onto the base and the area below the first element 20. Each basin 40 is connected by a conduit 41 to the respective receptacles 34, 35, 36, 37, and 38. Communicating with the undersides of receptacles 34, 35, 36, 37, and 38 are pumps 42, 43, 44, 45, and 46, respectively. With the exception of pump 42, these pumps are connected to the conduits 28 leading to upper sides of the dispensing elements so as to effect recirculating of the collected leaching solution, containing a concentrate of the soluble desired vitamin $B_{12}$ active product, through the various elements. As noted in Fig. 1, pump 42 for receptacle 34 is connected to conduit 12 through which a portion of the collected solution passes to the prewetter 11 to function as the wetting agent for the relatively dry sludge introduced thereinto. It is to be understood, of course, if desired, a pump for one of the other receptacles may be connected to conduit 12 for supplying the wetting solution. It is found, however, that more effective wetting of the sludge results when the wetting agent has a high concentration of the desired soluble product. Furthermore, the number of dispensing elements and their respective receptacles may be varied, as desired, without departing from the scope of this invention.

Supplementing the recirculated leaching solution passed through the station beneath the last dispensing element 23 is tap water or the particular solvent, free of any of the desired vitamin $B_{12}$ active product, which is discharged into the upper side of the element through a conduit 47.

Subsequent to leaching of the deposited sludge at the station beneath the last element 23, the leached sludge is removed in a radial direction from the base 14 by a motor driven scroll 48 or other suitable device disposed above base 14 and adjacent element 23. The removed leached sludge is deposited into a feeder tank 50 from which it is subsequently fed into a dryer 51. The dryer 51, in this instance, is provided with a combustion chamber 53 from which forced heated air is passed to the dryer through a conduit 54 to effect proper drying of the leached sludge. The leached sludge introduced into the dryer contains 42–50% moisture, however, upon the sludge leaving the dryer through a conduit 52, the moisture content thereof has been reduced to approximately 3–5% which is substantially the same moisture content that the charge sludge had prior to being fed into the prewetter.

The leaching process does not substantially deplete the nitrogen content of the sludge and when the extracted sludge is redried the particles are essentially the same size as they originally were. Accordingly, the value of the sludge has not been decreased by this method even though a valuable vitamin $B_{12}$ active material has been extracted.

Each of the receptacles 34 through 38 is connected by suitable conduits 55 to a vacuum pump 55a leading from the upper side of each receptacle. The pump 55a, in this instance, is common to all of the receptacles and thus serves to create a vacuum in each basin 40 to facilitate the passage of solution through the bed of sludge deposited on the foraminous base 14.

As noted in Fig. 1, each successive receptacle 34 through 38 is positioned on a somewhat lower level than the preceding one and the receptacles are interconnected by overflow conduits 56 so that, when a predetermined amount of leaching solution has collected in a higher receptacle, a portion of the solution from that receptacle will overflow into the succeeding or next lower receptacle rather than be recirculated by the pump communicating with the underside of the higher receptacle. Thus, by reason of this arrangement of the receptacles with reference to the movement of the table 14, there is provided a continuous enrichment of the solvent as it passes through the circulating system involving receptacle 38 and pump 46 successively through the other circulating systems via conduits 56 and eventually to the system involving receptacle 34, pump 42, and the prewetter 11.

Communicating with receptacle 34 at a point slightly below the lower end of the overflow conduit 56 therefor is the aforementioned outlet conduit 57 through which the overflow portion of the strong solution collected in said receptacle is withdrawn. The withdrawn solution is then fed into an evaporator 58 wherein the concentration of the desired vitamin $B_{12}$ active product in the solution is materially increased so as to produce a stable solution suitable for storage over a prolonged period of time or for further evaporation to produce a dry powder.

In order to prevent clogging or blinding of the foraminous filter base 14 during continuous operation, one segment 59, see Fig. 1, of the base positioned directly under the inlet conduit 13 is provided which is isolated from the vacuum sections of the filter and is supplied with air under slight pressure through conduit 60. The air thus passes upwardly through the filter at about the point the sludge slurry is deposited thereon from the prewetter 11. This aeration assists in evenly distributing the sludge radially over the surface of the base so that it may be more efficiently leached as it moves to the various stations under the several weir boxes or elements 20 through 23.

In practicing the process, dried activated sludge (Milorganite) containing approximately 3–5% moisture is slurried in the prewetter 11 with a solution containing approximately 10–12% solids obtained from previously leached sludge from receptacle 34. The wetted sludge, while disposed within reservoir 11, is subjected to mild agitation so as to keep the solids in suspension and moving. By reason of the mildness of agitation the sludge particles are not broken up thereby permitting the texture of the final processed sludge to be substantially the same as the initial charge material.

The sludge remains in the prewetter or reservoir 11 for approximately 25 minutes; however, this time might be varied depending upon the rate of feed of the sludge and the recirculating cycle of the leaching solution. The wetted sludge is then deposited upon the moving foraminous base, and progressively passes through the several stations wherein the soluble vitamin $B_{12}$ active product is extracted from the sludge. At each successive station the leaching is effected by a solution having a progressively smaller concentration of the soluble product therein. The leaching solution at each station is collected and substantially all thereof is recirculated through the deposited sludge. At the last washing station, the recirculated leaching solution is supplemented by make-up solvent, which is free from the soluble product. Water heated to 70° C. may be satisfactorily used at this point. After the deposited sludge has passed the last station, it is removed from the base by the screw conveyor 48 and dried. The amount of solvent (water) introduced at the last station through conduit 47 is essentially equal to the amount of solvent retained in the sludge upon it being removed from the foraminous base plus the amount of solvent in the product withdrawn from the apparatus through line 57. The stable high potency vitamin $B_{12}$ active solution may be used either in the liquid, concentrated, or powdered state as a supplement for animal feed for the production of crystalline vitamin $B_{12}$ and for other important uses.

Thus, it will be seen that a process and apparatus for producing a vitamin $B_{12}$ active product from activated sewage sludge have been provided which utilize a readily available, inexpensive source mtaerial, permit an abundant and continuous production of such a product, do not impair the commercial value of the source material for subsequent use as a fertilizer, and require minimum effort, as well as cost, to maintain in proper working order.

While a particular embodiment of this invention is shown above, it will be understood, of course, that the invention is not to be limited thereto, since many modifications may be made, and it is contemplated, therefore, by the appended claim, to cover any such modifications as fall within the true spirit and scope of this invention.

We claim:

A continuous process for producing a vitamin $B_{12}$ active product from dry sewage sludge which comprises contacting said dry sludge with a solution enriched with a vitamin $B_{12}$ extract as hereinafter defined, forming a layer of the thus treated sludge, moving said layer to a leaching zone, passing a vitamin $B_{12}$ solvent onto and through said layer in said zone to leach vitamin $B_{12}$ from said sludge in said layer and to provide said vitamin $B_{12}$ extract, recycling a first portion of said extract through said layer in said zone for further enrichment of vitamin $B_{12}$ in said extract, cycling a second portion of said extract to said dry sludge-contacting step, and withdrawing a third portion of the vitamin $B_{12}$ extract from the system for further concentration.

References Cited in the file of this patent

UNITED STATES PATENTS

| | | |
|---|---|---|
| 1,694,361 | Sterling | Dec. 4, 1928 |
| 2,047,852 | Bohm | July 14, 1936 |
| 2,635,985 | Denkewalter | Apr. 21, 1953 |
| 2,646,386 | Miner | July 21, 1953 |

OTHER REFERENCES

Cofield: Chem. Eng., January 1951, pp. 133–135.